(12) United States Patent
Itou et al.

(10) Patent No.: US 11,370,476 B2
(45) Date of Patent: Jun. 28, 2022

(54) DRIVE DEVICE

(71) Applicant: DENSO CORPORATION, Kariya (JP)

(72) Inventors: Daiki Itou, Kariya (JP); Naohiro Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 124 days.

(21) Appl. No.: 16/874,663

(22) Filed: May 14, 2020

(65) Prior Publication Data

US 2020/0361519 A1    Nov. 19, 2020

(30) Foreign Application Priority Data

May 17, 2019  (JP) .............................. JP2019-093618

(51) Int. Cl.
  *B62D 5/04*   (2006.01)

(52) U.S. Cl.
  CPC ........... *B62D 5/046* (2013.01); *B62D 5/0403* (2013.01)

(58) Field of Classification Search
  CPC ............................ B62D 5/046; B62D 5/0403
  See application file for complete search history.

(56) References Cited

U.S. PATENT DOCUMENTS

| | | | |
|---|---|---|---|
| 9,831,748 B2* | 11/2017 | Hayashi ................. | H02K 11/33 |
| 2013/0257193 A1* | 10/2013 | Toda ....................... | H02K 5/10 |
| | | | 310/52 |
| 2018/0127020 A1* | 5/2018 | Asao ...................... | H02K 11/00 |
| 2019/0252953 A1 | 8/2019 | Tsuboi et al. | |
| 2019/0273416 A1* | 9/2019 | Kizu ...................... | H02K 15/085 |
| 2019/0276071 A1* | 9/2019 | Nagashima ........... | B62D 5/046 |
| 2020/0028405 A1* | 1/2020 | Sugimori ............... | H02K 11/20 |
| 2021/0013763 A1* | 1/2021 | Kobayashi ............. | H02K 11/33 |

FOREIGN PATENT DOCUMENTS

| | | |
|---|---|---|
| JP | 200735933 A | 2/2007 |
| JP | 201941519 A | 3/2019 |

* cited by examiner

*Primary Examiner* — Jacob D Knutson
(74) *Attorney, Agent, or Firm* — Maschoff Brennan (57) ABSTRACT

A drive device includes a motor, a control board, a connector located between the motor and the control board in a predetermined direction, and a solder connecting a motor wire and the control board. The control board has a through-hole opening on an upper side and on a lower side. The connector includes a support portion that protrudes toward the control board such that a tip surface of the support portion is in contact with the lower side of the control board, a guide portion that has a guide hole through which the motor wire passes, the guide hole opening on a lower side and on an upper side. The upper side of the connector is spaced from the lower side of the control board in the predetermined direction. A fillet of the solder is formed on both the upper side and the lower side of the control board.

1 Claim, 13 Drawing Sheets

DRIVE DEVICE

CROSS REFERENCE TO RELATED APPLICATION

This application is based on and incorporates herein by reference Japanese Patent Application No. 2019-093618 filed on May 17, 2019.

TECHNICAL FIELD

The present disclosure relates to a drive device having a motor and a control board.

BACKGROUND

A general drive device includes a housing member and an electric motor. An electronic circuit board for controlling the motor is housed in the housing member.

SUMMARY

A drive device according to an aspect of the present disclosure includes: a motor; a control board configured to control the motor; a connector located between the motor and the control board in a predetermined direction, the connector electrically connecting the control board and an external device; and a solder connecting the control board and a motor wire that extends from the motor to the control board through the connector in the predetermined direction. The control board has a through-hole through which the motor wire passes, the through-hole opening on a lower side of the control board facing the connector and on an upper side of the control board that is an opposite side of the lower side. The connector includes: a base portion connected to the motor; a support portion that protrudes from the base portion in the predetermined direction toward the control board such that a tip surface of the support portion is in contact with the lower side of the control board, thereby the support portion supporting the control board; and a guide portion that has a guide hole through which the motor wire passes, the guide hole opening on a lower side of the connector facing the motor and on an upper side of the connector facing the control board. The upper side of the connector is farther in the predetermined direction from the lower side of the control board than the tip surface is from the lower side of the control board. A fillet of the solder is formed on both the upper side and the lower side of the control board.

DETAILED DESCRIPTION

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Comparative Example

In a drive device according to a comparative example of the present disclosure, the electric circuit board and the motor of the drive device are electrically connected by soldering. If soldering is insufficient, electrical connection failure between the electronic circuit board (control board) and the motor may occur.

It is an object of the present disclosure to provide a drive device in which electrical connection failure between a motor and a control board is suppressed. Hereinafter, embodiments will be described with reference to the drawings.

First Embodiment

Figure 1:
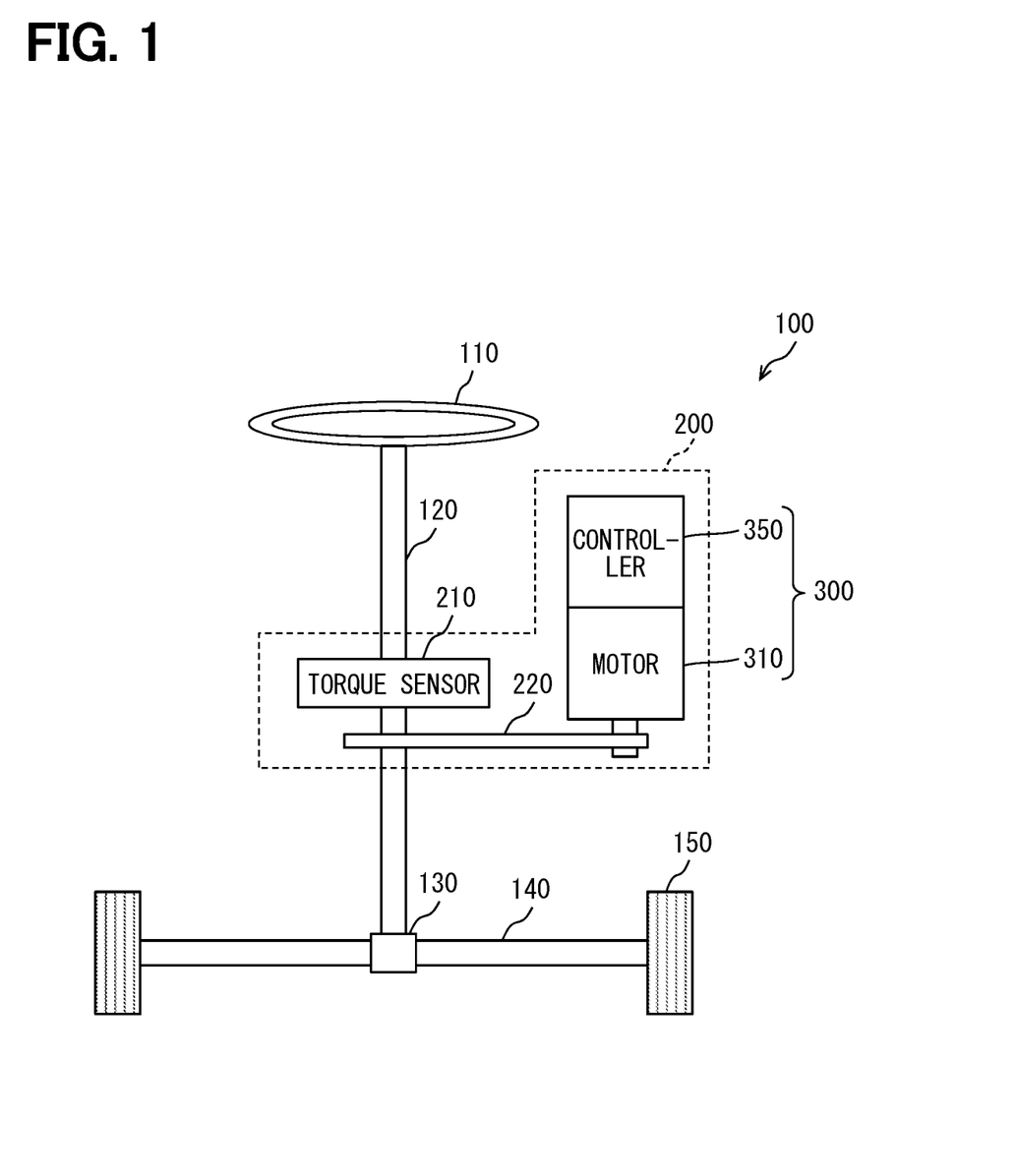
FIG. 1 is a schematic diagram illustrating a steering system.

An electric power steering device to which a drive device according to the present embodiment is applied will be described with reference to FIGS. 1 to 13.
<Steering System>
As shown in FIG. 1, the electric power steering device 200 is used for a steering system 100 of a vehicle. The steering system 100 includes a steering wheel 110, a steering shaft 120, a pinion gear 130, a rack shaft 140, wheels 150, and the electric power steering device 200.

The steering wheel 110 is connected to the steering shaft 120. A pinion gear 130 is provided at an end of the steering shaft 120. The pinion gear 130 meshes with the rack shaft 140. A pair of road wheels 150 is connected to both ends of the rack shaft 140 via tie rods or the like.

When a driver turns the steering wheel 110, the steering shaft 120 connected to the steering wheel 110 rotates. A rotational motion of the steering shaft 120 is converted into a linear motion of the rack shaft 140 by the pinion gear 130. As a result, the pair of wheels 150 are steered to an angle corresponding to the amount of displacement of the rack shaft 140.
<Electric Power Steering Device>
The electric power steering device 200 has a function of assisting the turn of the steering wheel 110. The electric power steering device 200 includes a torque sensor 210, a reduction gear 220, and a drive device 300 as shown in FIG. 1. The drive device 300 includes a motor 310 and a controller 350.

The torque sensor 210 is configured to detect a steering torque of the steering shaft 120. The steering torque detected by the torque sensor 210 is input to the controller 350.

The controller 350 is configured to control the actuation of the motor 310 based on the steering torque detected by the torque sensor 210, signals input from ECUs mounted on the vehicle, and the like.

The motor 310 is connected to the reduction gear 220 through a belt (not shown). The reduction gear 220 decelerates the rotation of the motor 310 and transmits it to the steering shaft 120. Accordingly, the turn (steering) of the steering wheel 110 is assisted.

The electric power steering device 200 of the present embodiment is a column assist electric power steering device that provides an assist force to the steering shaft 120 for assisting the steering. However, the configuration of the electric power steering device 200 is not limited to the above-described example. The electric power steering device 200 may be a rack assist electric power steering device that provides an assist force to the rack shaft 140 or a pinion assist electric power steering device that provides an assist force to the pinion gear 130.

<Drive Device>

Figure 2:
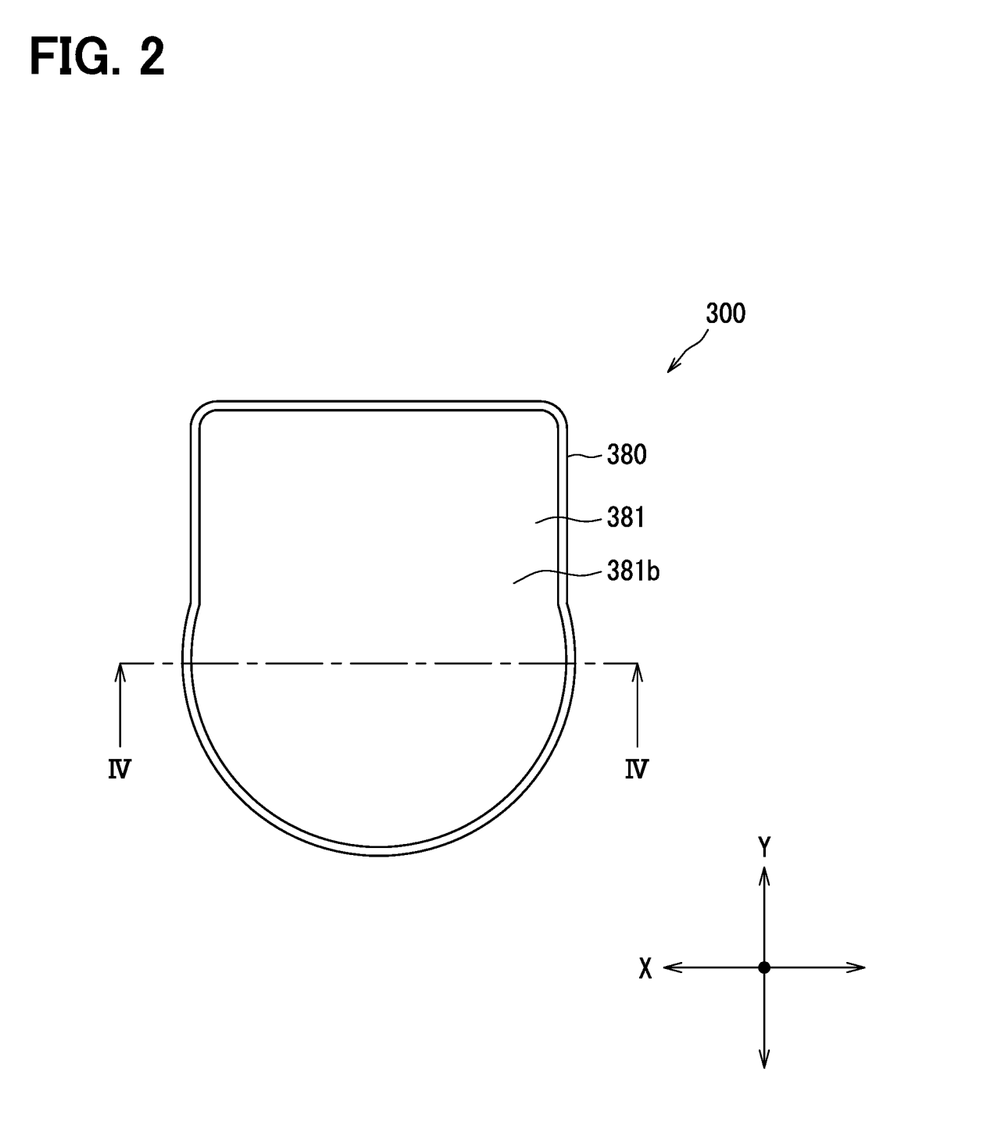
FIG. 2 is a top view of a drive device.
Figure 3:
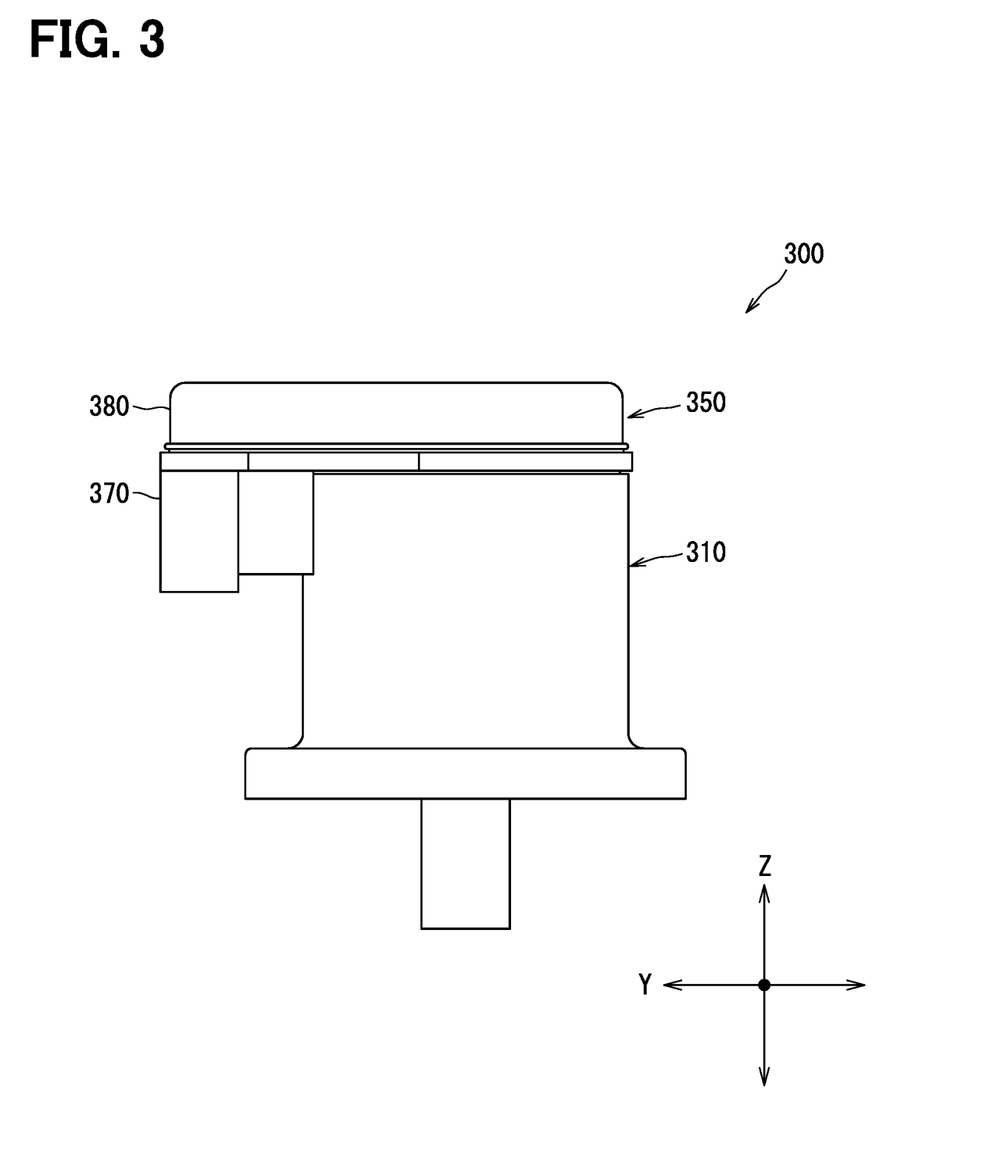
FIG. 3 is a side view of a drive device.

The drive device 300 will be described next. Hereinafter, three directions orthogonal to each other are referred to as an X-direction, a Y-direction, and a Z-direction. The Z-direction corresponds to a predetermined direction. The drive device 300 includes the motor 310 and the controller 350 as described above. As shown in FIGS. 2, 3, the motor 310 and the controller 350 are arranged in the Z-direction and connected with each other. The drive device 300 has so called machine-electronic integrated structure.

<Motor>

Figure 4:
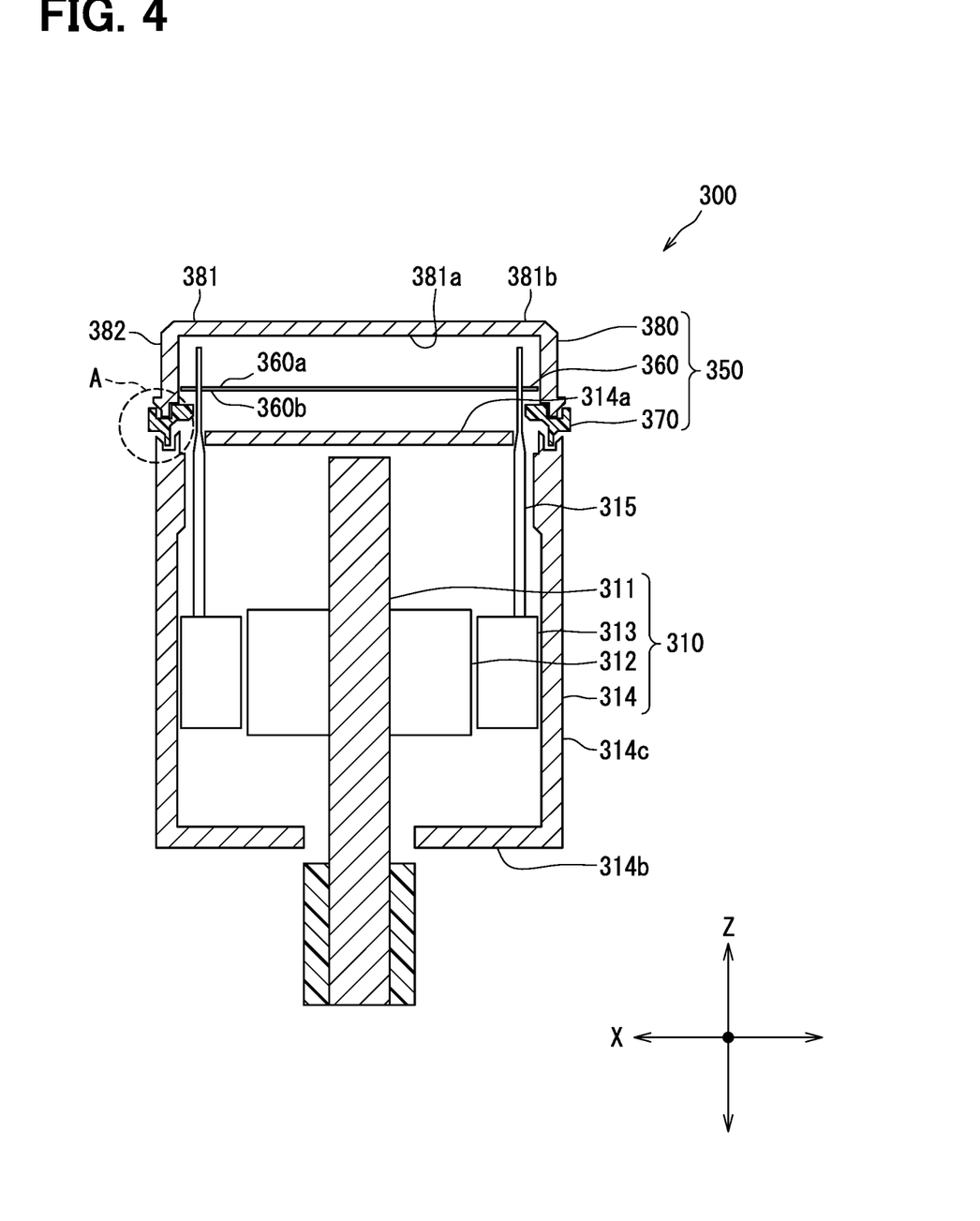
FIG. 4 is a cross-sectional diagram taken along IV-IV line of FIG. 2.

As simply illustrated in FIG. 4, the motor 310 includes a motor shaft 311, a rotor 312, a stator 313, and a housing 314. The housing 314 has a circular cylindrical shape whose axial direction is the Z-direction. The motor shaft 311, the rotor 312, and the stator 313 are housed in the housing 314. The motor 310 corresponds to the electric motor.

The motor shaft 311 extends in the Z-direction. The rotor 312 is fitted in the center of the motor shaft 311. The stator 313 surrounds the rotor 312 and is housed in the housing 314. Rotational torque is generated on the motor shaft 311 by magnetic fields emitted from the rotor 312 and the stator 313. Thereby, the motor shaft 311 rotates.

The stator 313 of the present embodiment has two windings. Each of the two windings includes a three phase (U, V, W) stator coil that constitutes a brushless motor. Six motor wires 315 for supplying three-phase electric power to the three phase stator coil having two windings extend in the Z-direction from the housing 314 toward the controller 350.

As described above, the housing 314 has a circular cylindrical shape. The housing 314 has a first end side 314a and a second end side 314b which face in the Z-direction, and a lateral side 314c connecting these end sides.

Figure 5:
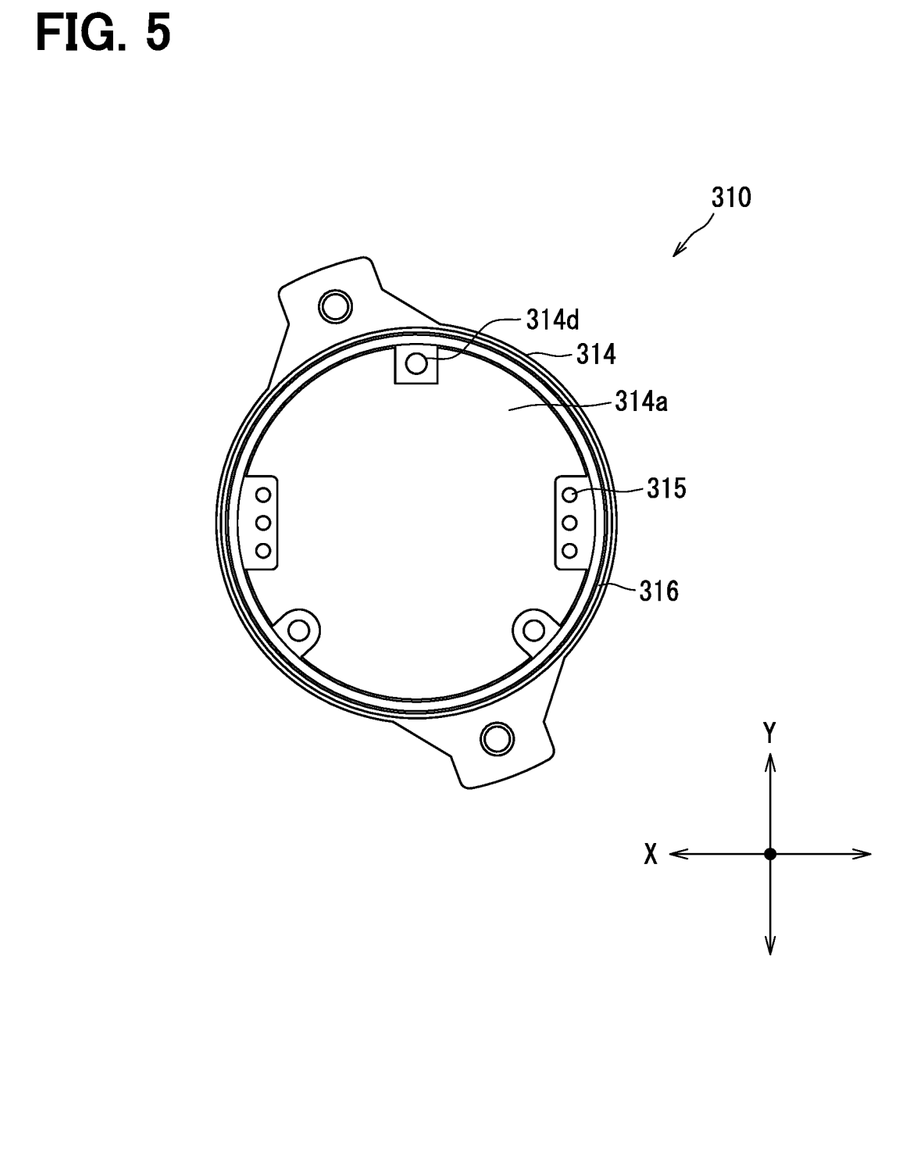
FIG. 5 is a top view of a motor.
Figure 6:
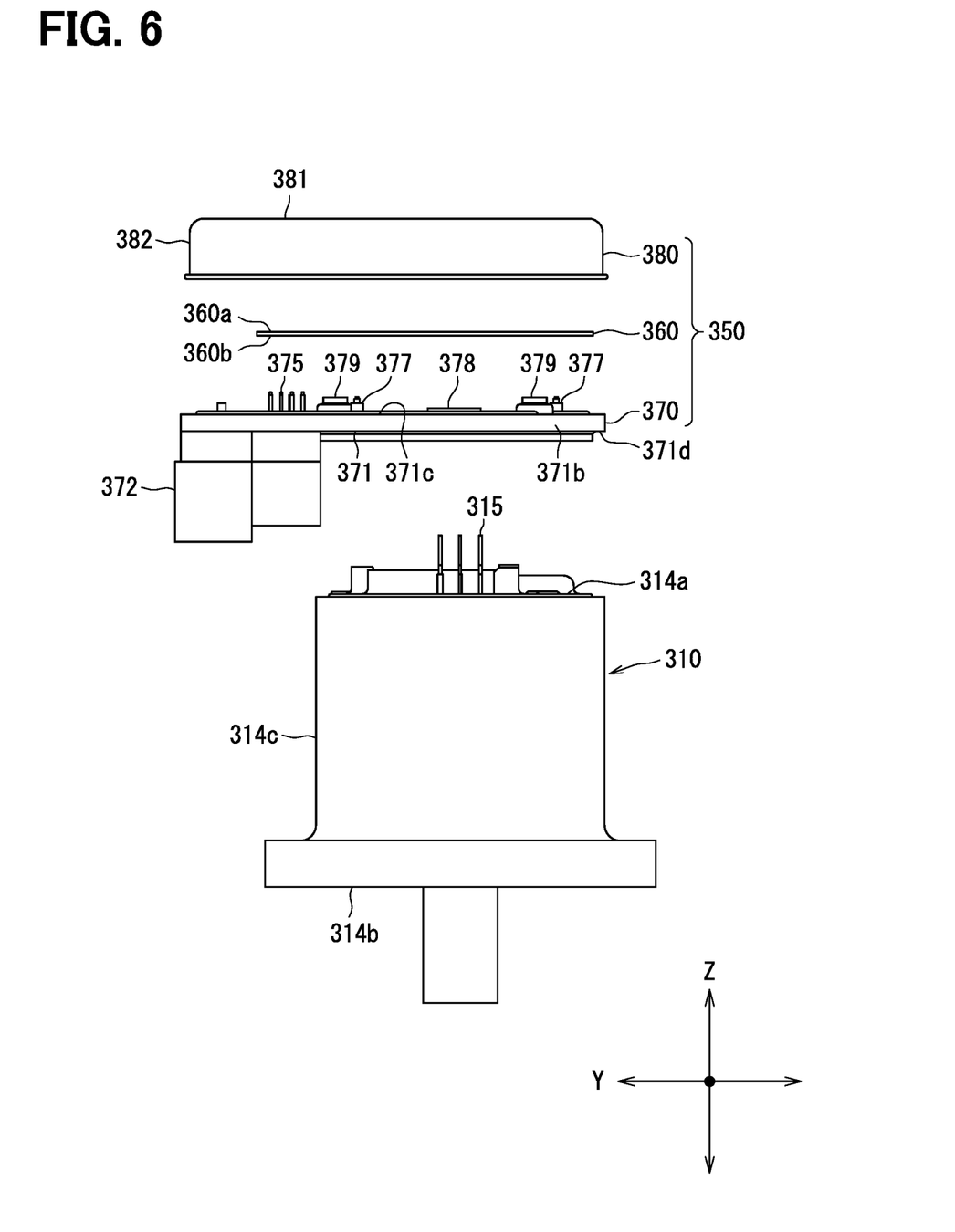
FIG. 6 is an exploded side view of the drive device.

As shown in FIGS. 4-6, each end of the six motor wires 315 connected to the three-phase stator coil protrudes out of the housing 314 from the first end side 314a. The ends of the motor wires 315 are connected to a control board 360 described later. One end of the motor shaft 311 protrudes out of the housing 314 from the second end side 314b, as shown in FIGS. 3, 4. The one end of the motor shaft 311 is connected to the reduction gear 220 through a belt.

As shown in FIG. 5, the first end side 314a has a circular shape in a plane facing the Z-direction. The first end side 314a has bolt holes 314d for fixing a connector 370 to the housing 314 as well as holes through which the end of the motor wire 315 passes.

In the present embodiment, three bolt holes 314d open on the first end side 314a. The three bolt holes 314d are located on a circumference of a circle whose center is the center of the first end side 314a. The three bolt holes are arranged at intervals of 120 degrees.

Figure 11:
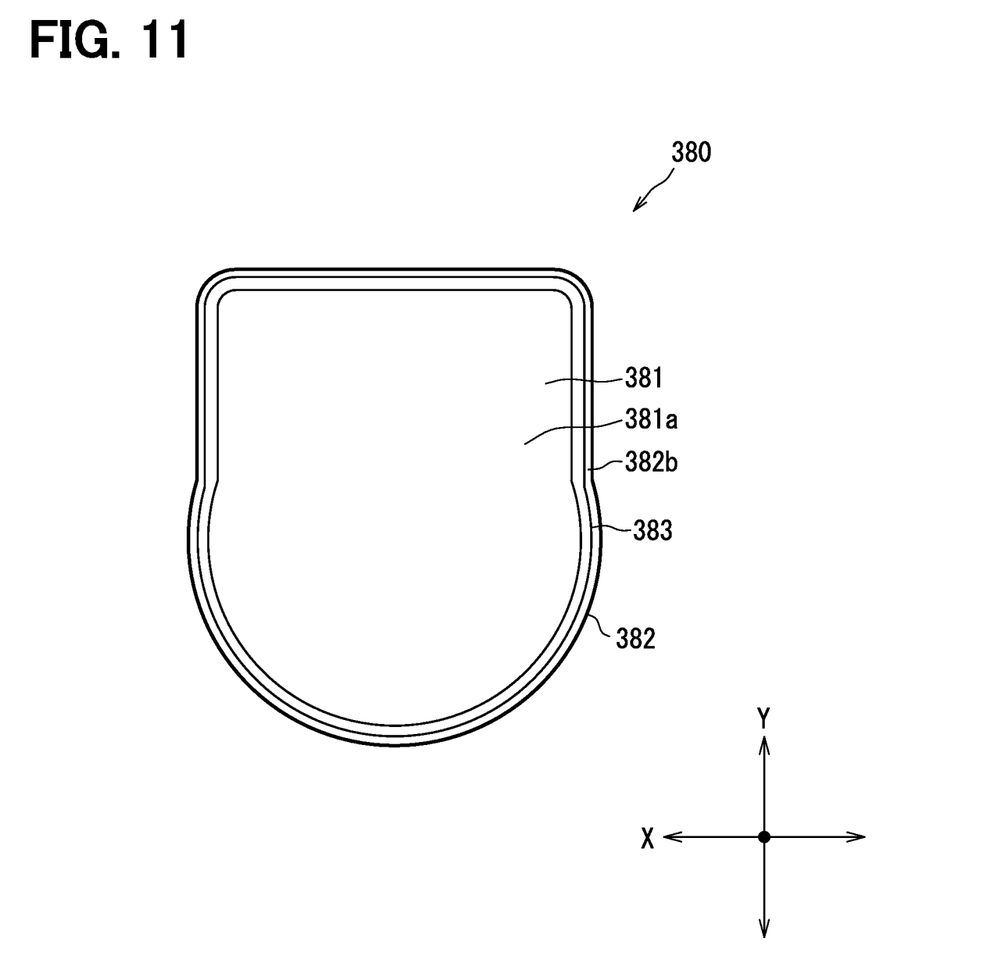
FIG. 11 is a bottom view of a cover.

A first recess 316 recessed in the Z-direction is formed on the rim of the first end side 314a as shown in FIGS. 4, 5. The first recess 316 has an annular shape about a line along the Z-direction. The second recess 374 is filled with a second adhesive 392 as shown in FIG. 11. The housing 314 and the connector 370 are physically connected through the first adhesive 391.

<Controller>

The controller 350 includes the control board 360, the connector 370, and a cover 380 as shown in FIGS. 4, 6. The control board 360 is fixed to the housing 314 through the connector 370. The cover 380 is fixed to the connector 370. Since the housing 314 and the cover 380 are fixed through the connector 370, a housing space for the control board 360 is defined.

<Control Board>

The control board 360 has a wiring board having a plate shape that is thin in the Z-direction. Active elements such as MOSFET and passive elements such as condenser are mounted on the wiring board. The control board 360 includes a microcontroller, a gate driver, an inverter, and the like for controlling the motor 310 which are constituted by a wiring pattern of the wiring board, the active elements, and the passive elements.

Figure 7:
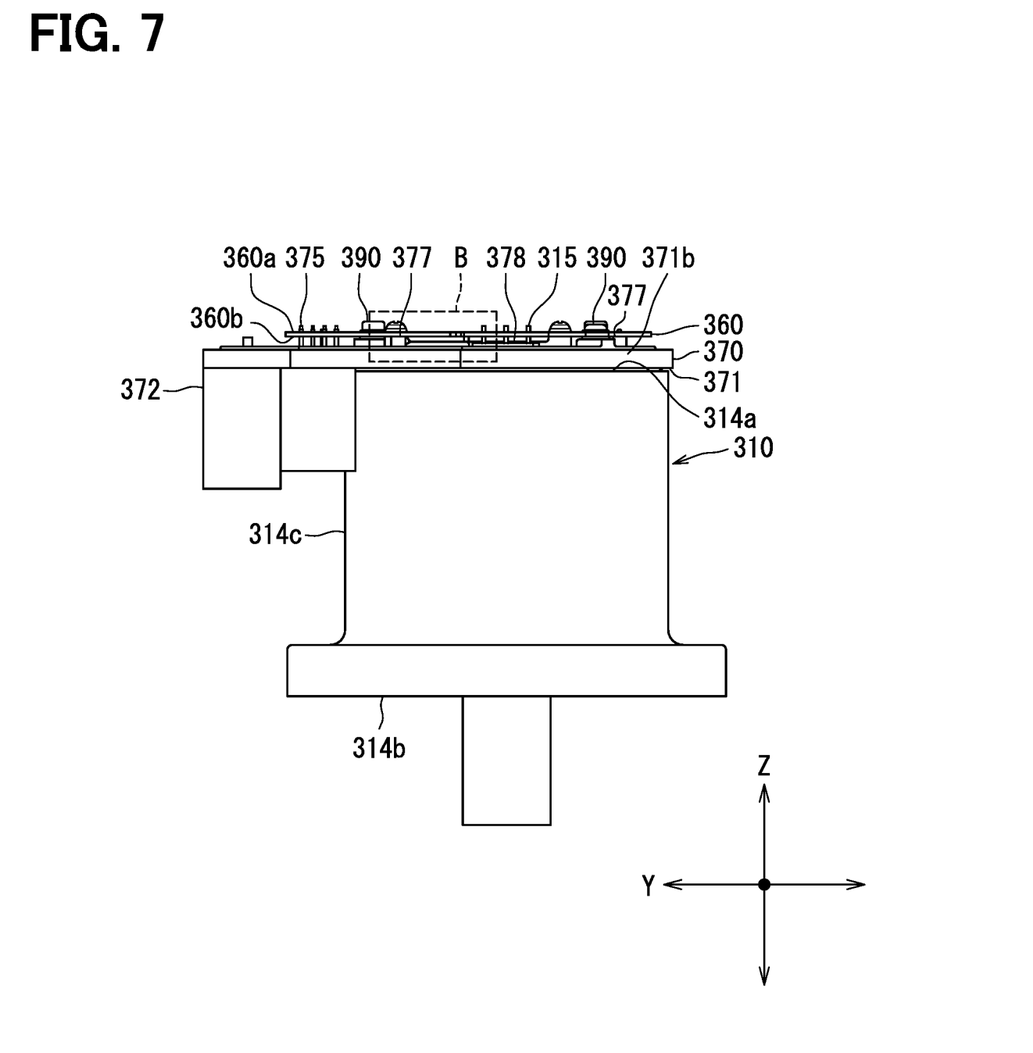
FIG. 7 is a side view showing a situation where a connector and a control board are mounted on the motor.

The control board 360 has an upper side 360a and a lower side 360b in the Z-direction as shown in FIGS. 6, 7. The control board 360 is mounted on the connector 370 such that a part of the lower side 360b is spaced in the Z-direction from the first end side 314a of the housing 314. The lower side 360b faces in the Z-direction.

Figure 8:
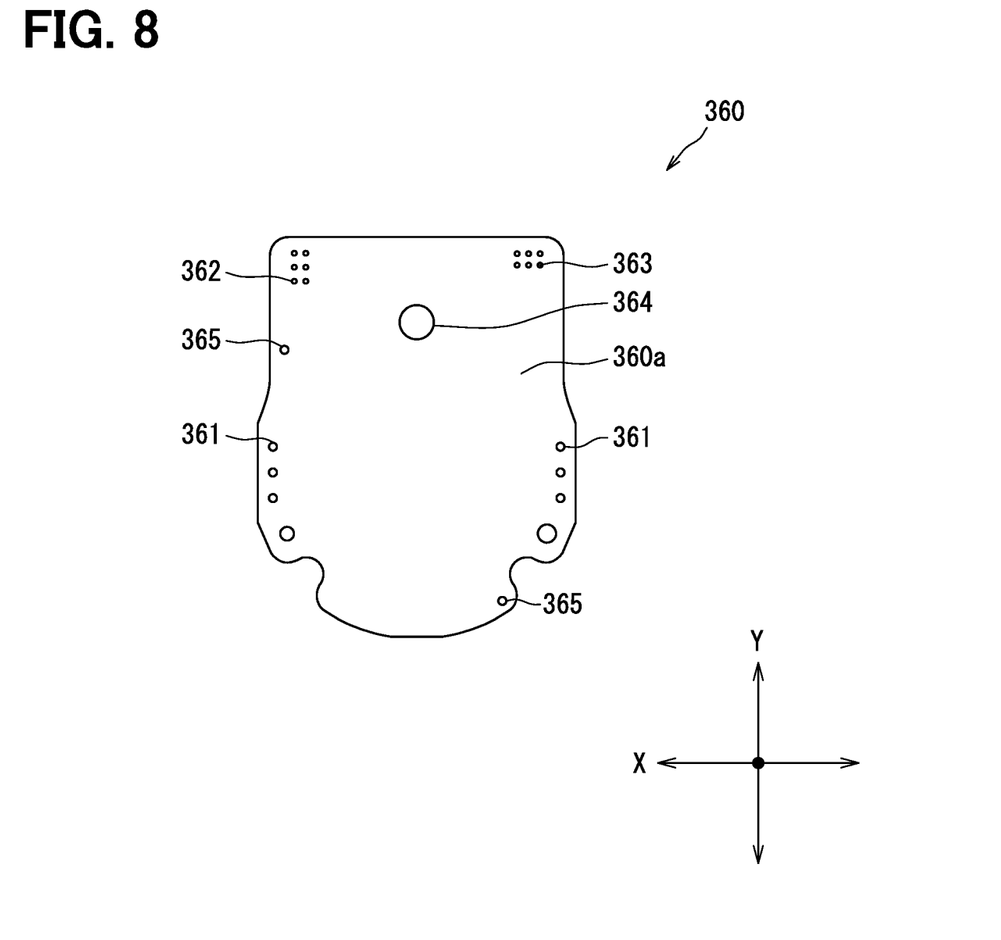
FIG. 8 is a top view of a control board.

The control board 360 has multiple holes that open on the upper side 360a and the lower side 360b as shown in FIG. 8. Specifically, the control board 360 has motor holes 361, sensor holes 362, and communication holes 363. The motor hole 361 is a through-hole.

The motor wire 315 passes through the motor hole 361. A sensor pin 375 electrically connected with the torque sensor 210 passes through the sensor hole 362. A communication pin 376 for communicating with the ECUs mounted on the vehicle passes through the communication hole 363. The motor wire 315, the sensor pin 375, and the communication pin 376 are bonded to the control board 360 by soldering.

The control board 360 further has a power hole through which a power pin (not shown) for electrically connecting with the battery passes. The power pin is also bonded to the control board 360 by soldering.

The control board 360 further has a bolt through-hole 364 and positioning holes 365. The shank of a bolt 390 fastened to the bolt hole 314d passes through the bolt through-hole 364. A protrusion 377b described later passes through the positioning hole 365. As shown in FIG. 8, the control board 360 has two positioning holes 365. The positioning holes 365 are spaced from each other in the X-direction and the Y-direction.

<Connector>

Figure 9:
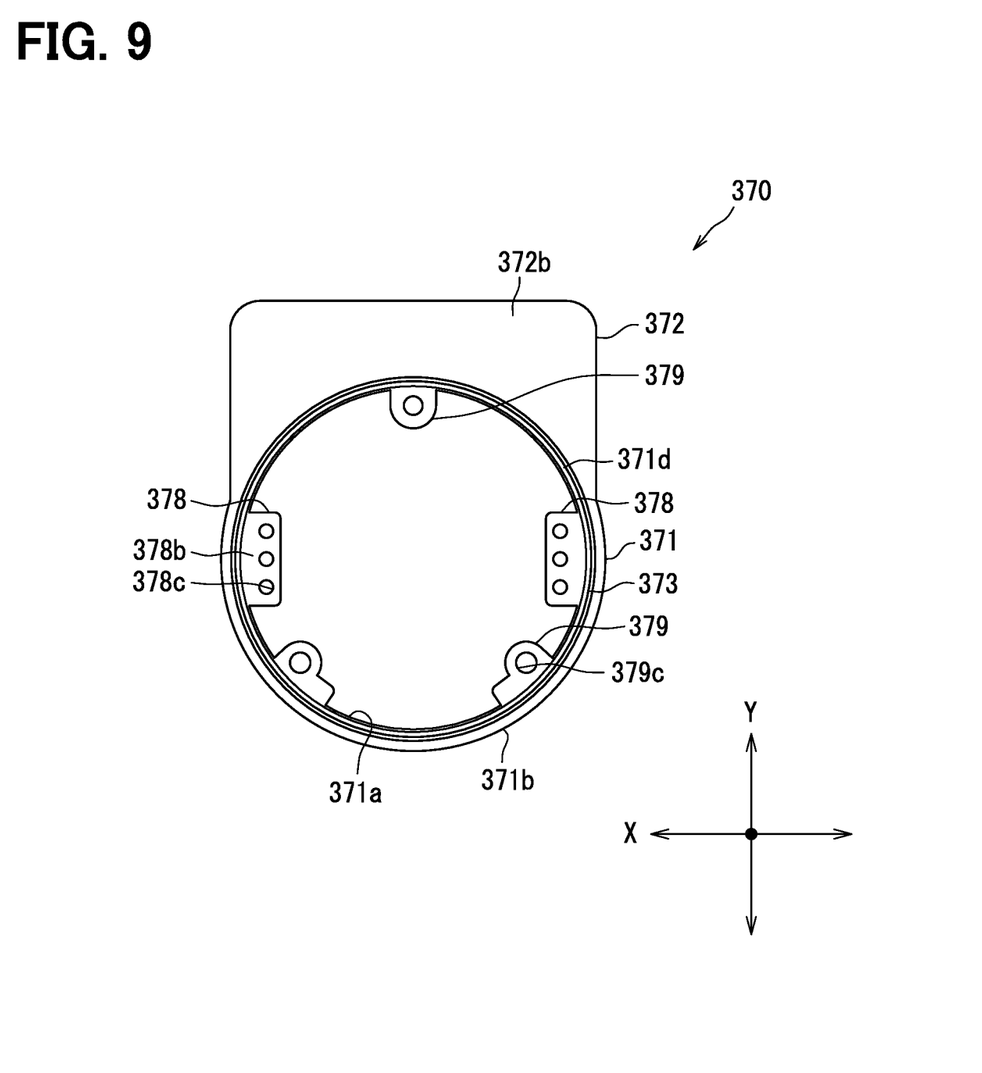
FIG. 9 is a bottom view of a connector.
Figure 10:
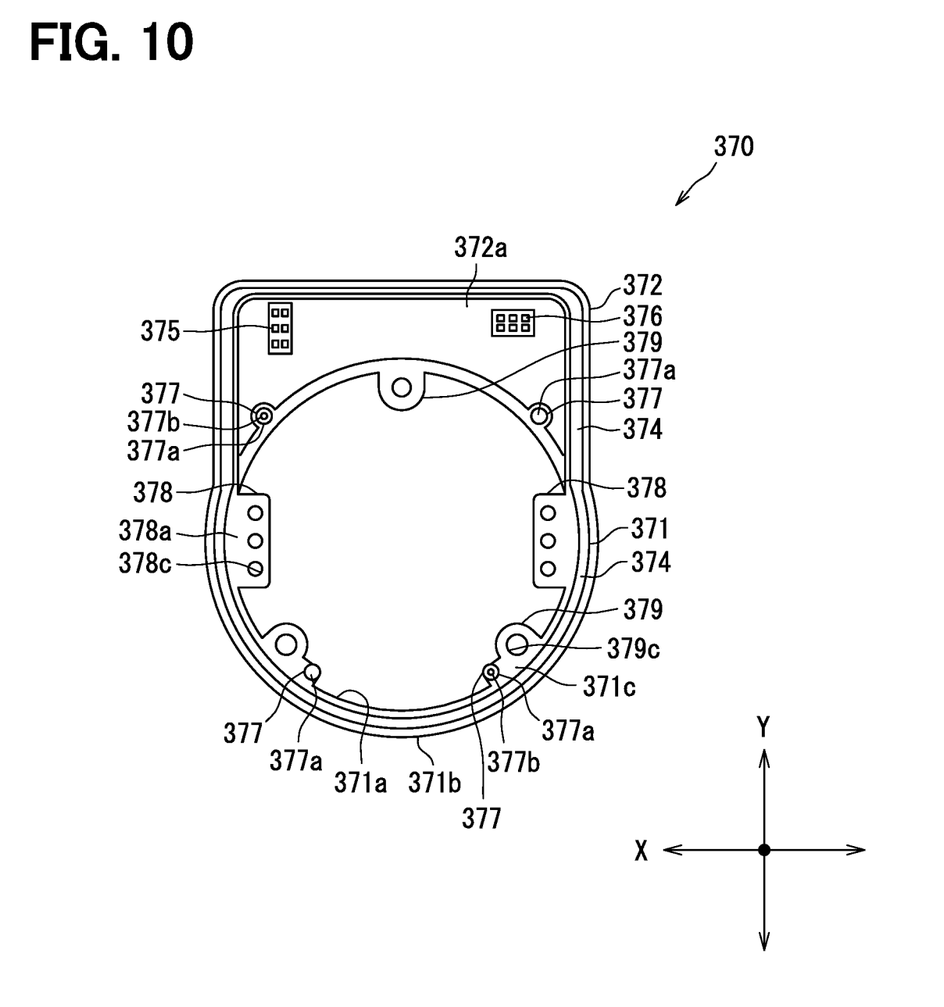
FIG. 10 is a top view of the connector.

Specifically, the connector 370 has a base portion 371 and a connection portion 372 as shown in FIGS. 9, 10.

The base portion 371 has an annular shape opening in the Z-direction. That is, the connector 370 may have a cylindrical shape. The base portion 371 has an inner annular surface 371a and an outer annular surface 371b having an annular shape about a line along the Z-direction. The base portion 371 has an upper support surface 371c and a lower support surface 371d connecting the two annular surfaces.

The upper support surface 371c and the lower support surface 371d are aligned in the Z-direction.

A first protrusion 373 protrudes from a rim of the lower support surface 371d in the Z-direction as shown in FIGS. 4, 9. The first protrusion 373 has an annular shape about a line along the Z-direction.

Figure 12:
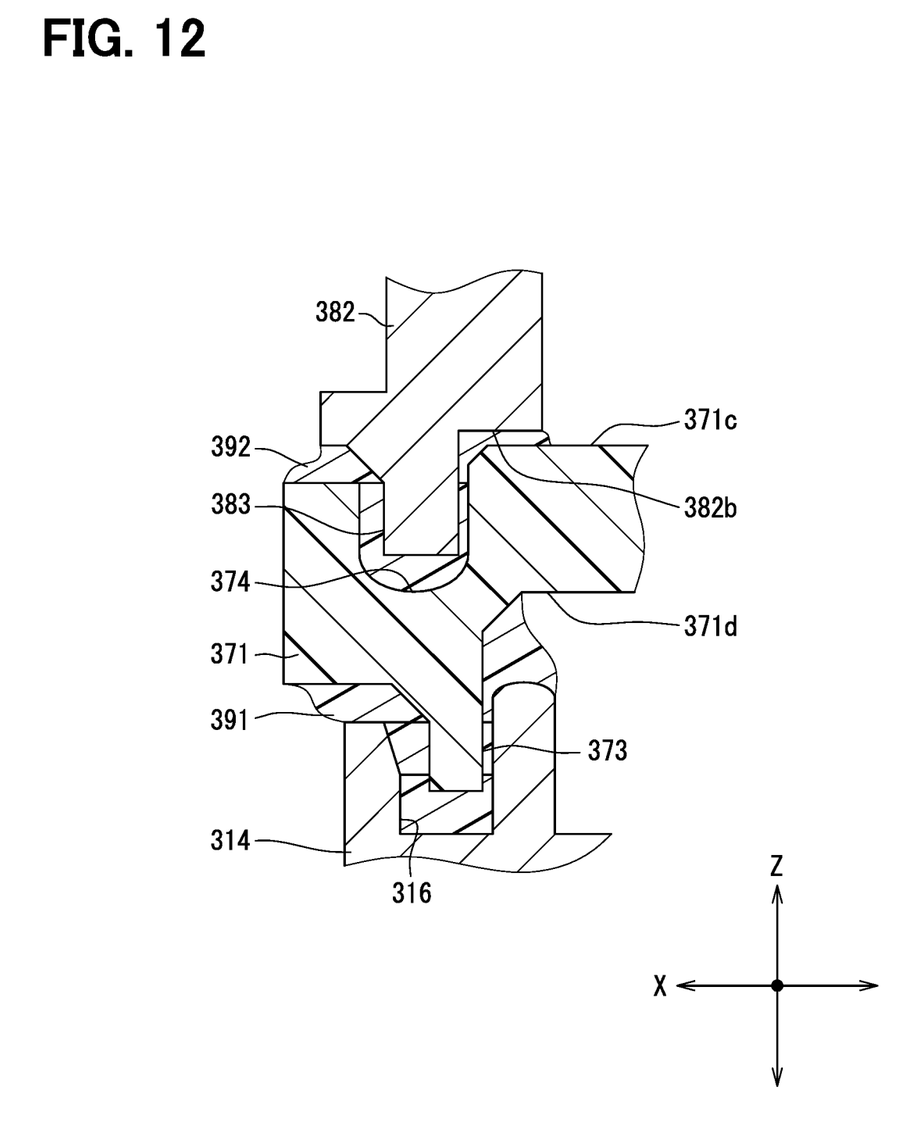
FIG. 12 is an enlarged cross-sectional view of a region A surrounded by a dashed line shown in FIG. 4.

The first protrusion 373 is inserted into the first recess 316 of the housing 314 as shown in FIG. 12. The first protrusion 373 and the first recess 316 are physically connected through the first adhesive 391. The gap between the first protrusion 373 and the first recess 316 is filled the first adhesive 391. Accordingly, the gap between the connector 370 and the motor 310 is sealed by the first adhesive 391.

The connection portion 372 extends from a part of the outer annular surface 371b of the base portion 371 in the Y-direction. When the base portion 371 is fixed to the first end side 314a of the housing 314, the connection portion 372 does not face the first end side 314a in the Z-direction as shown in FIG. 7.

The sensor pin 375, the communication pin 376, and the power pin are formed in the connection portion 372 by insert molding. Ends of each of these three pins are exposed from the connection portion 372.

The connection portion 372 has a first connection surface 372a and a second connection surface 372b aligned in the Z-direction as shown in FIGS. 9, 10. One end of each of the three pins protrudes in the Z-direction from the first connection surface 372a and is connected to the control board 360. The other end of each of the three pins protrudes from the second connection surface 372b and is connected to a wire harness (not shown). Accordingly, the control board 360 is electrically connected with the torque sensor 210, the ECUs, and the battery mounted on the vehicle. The torque sensor 210, the ECUs, and the battery are external devices.

A second recess 374 recessed in the Z-direction toward the lower support surface 371d is formed on a rim of the upper support surface 371c of the base portion 371 as shown in FIGS. 4, 10. The second recess 374 recessed in the Z-direction toward the second connection surface 372b is also formed on a rim of the first connection surface 372a of the connection portion 372.

The second recesses formed in the base portion 371 and the connection portion 372 are continuous to form an annular shape about a line along the Z-direction. The second recess 374 is filled with a second adhesive 392 as shown in FIG. 12. The base portion 371 and the cover 380 are physically connected with each other through the second adhesive 392.

As well as the base portion 371 and the connection portion 372, the connector 370 has support portions 377, guide portions 378, and flange portions 379 which are joined with the base portion 371.

The support portion 377 supports the control board 360. The support portions 377 are integrally provided with the inner annular surface 371a or the outer annular surface 371b. The support portion 377 formed on the inner annular surface 371a is positioned inside a disk-shaped space surrounded by the inner annular surface 371a. The support portion 377 formed on the outer annular surface 371b is positioned outside the disk-shaped space surrounded by the inner annular surface 371a.

Figure 13:
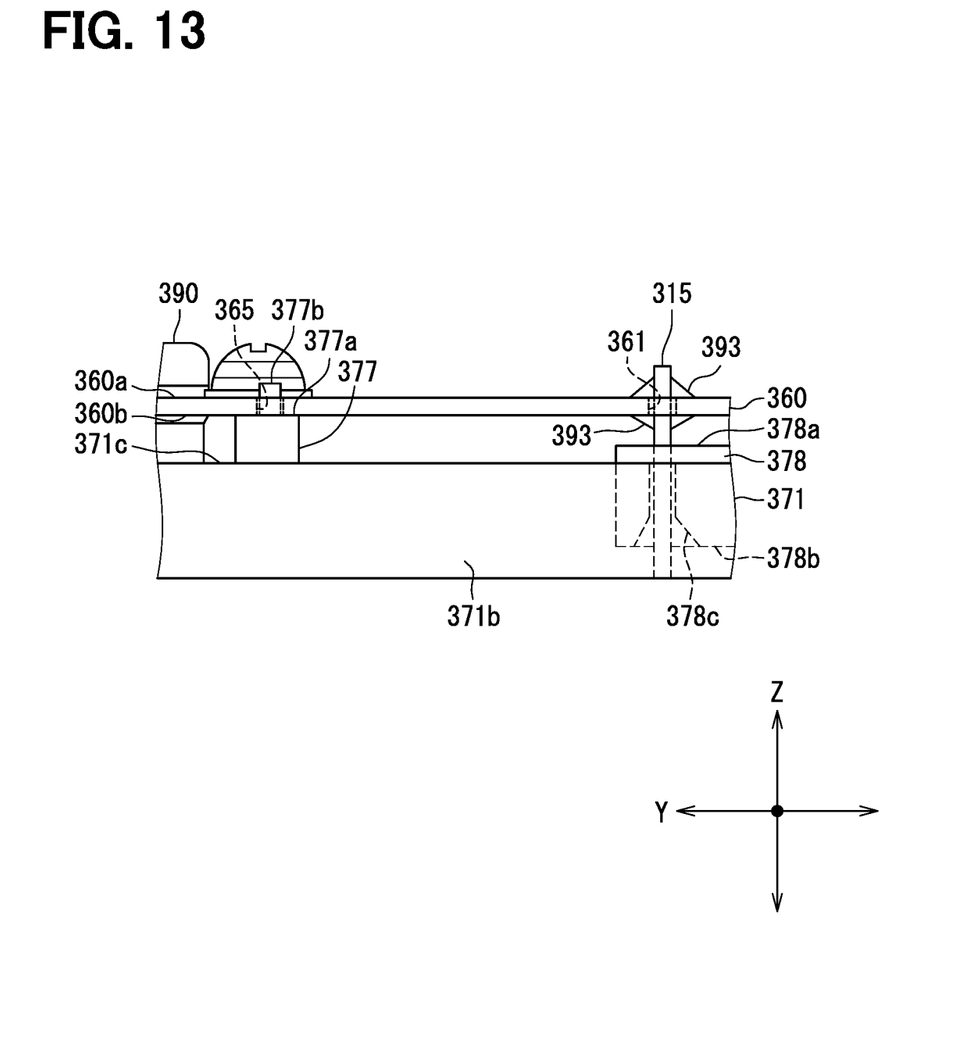
FIG. 13 is an enlarged side view of a region B surrounded by a dashed line shown in FIG. 7.

The support portions 377 protrude in the Z-direction from the lower support surface 371d toward the upper support surface 371c as shown in FIGS. 6, 13. Each of the support portions 377 has a support surface 377a facing in the Z-direction. The support surface 377a is farther from the lower support surface in the Z-direction than the upper support surface 371c is from. Accordingly, the support surface 377a is located upward in the Z-direction compared to the upper support surface 371c. The support surface 377a is a tip surface.

In the present embodiment, two support portions 377 are formed on the inner annular surface 371a and the outer annular surface 371b respectively. The two support portions 377 formed on the inner annular surface 371a are spaced in the Y-direction from the two support portions 377 formed on the outer annular surface 371b. The two support portions 377 formed on the inner annular surface 371a are spaced from each other in the X-direction. The two support portions 377 formed on the outer annular surface 371b are spaced from each other in the X-direction. The support surface 377a of each of the four support portions 377 faces in the Z-direction. The positions of the four support surfaces 377a in the Z-direction are equal.

One of the two support portions 377 formed on the inner annular surface 371a has a protrusion 377b further protruding in the Z-direction from the support surface 377a. One of the two support portion 377 formed on the outer annular surface 371b has a protrusion 377b further protruding in the Z-direction from the support surface 377a. The two protrusions 377b are spaced from each other in the X-direction and the Y-direction to be opposite points of the inner annular surface 371a.

When the control board 360 is mounted on the connector 370 as shown in FIGS. 6 and 7, the support surfaces 377a of the support portions 377 contact the lower side 360b of the control board 360. At the same time, the two protrusions 377b are inserted into the positioning holes 365 of the control board 360 respectively.

Accordingly, the control board 360 is supported by the base portion 371 such that the control board 360 is spaced from the upper support surface 371c in the Z-direction. Moreover, relative displacement between the connector 370 and the control board 360 in a direction intersecting the Z-direction is suppressed.

The guide portion 378 is positioned inside a disk-shaped space surrounded by the inner annular surface 371a. The guide portion 378 has guide holes 378c extending through the guide portion 378 in the Z-direction.

In the present embodiment, two guide portions 378 are connected to the inner annular surface 371a. The two guide portions 378 are spaced from each other in the X-direction to be located at opposite points of the inner annular surface 371a.

Each of the two guide portions 378 has three guide holes 378c. The three guide holes 378c are aligned in the Y-direction. Six motor wires 315 are inserted into the six guide holes 378c respectively.

The guide portion 378 has an upper side 378a and a lower side 378b aligned in the Z-direction, as shown in FIG. 13. The upper side 378a is closer to the upper support surface 371c in the Z-direction than the lower side 378b is to. The lower side 378b is closer to the lower support surface 371d in the Z-direction than the upper side 378a is to. The guide holes 378c open on both of the upper side 378a and the lower side 378b.

The upper side 378a is farther from the lower support surface 371d in the Z-direction than the upper support surface 371c is from. Accordingly, the upper side 378a is located upward in the Z-direction compared to the upper support surface 371c. The upper side 378a of the guide portion 378 is located outside the disk-shaped spaced surrounded by the inner annular surface 371a.

The upper side 378a is closer to the upper support surface 371c in the Z-direction than the support surface 377a of the support portion 377 is to. Accordingly, the upper side 378a is spaced from the support surface 377a in the Z-direction.

As described above, the control board 360 is mounted on the connector 370 such that the lower side 360b is in contact with the support surface 377a. In this situation, the lower side 360b is spaced from the upper side 378a in the Z-direction. Specifically, the opening of the motor hole 361 on the lower side 360b and the opening of the guide hole 378c on the upper side 378a are spaced from and aligned with each other in the Z-direction.

The lower side 378b is closer to the upper support surface 371c in the Z-direction than the lower support surface 371d is to. Accordingly, the lower side 378b is located upward in the Z-direction compared to the lower support surface 371d.

An inner radius of the opening of the guide hole 378c on the lower side 378b is larger than an inner radius of the opening of the guide hole 378c on the upper side 378a. That is, the guide hole 378c is tapered from the lower side 378b toward the upper side 378a.

The motor wire 315 is inserted into the guide hole 378c from the opening on the lower side 378b. The end of the motor wire 315 protrudes from the opening of the guide hole 378c on the upper side 378a toward the lower side 360b of the control board 360.

The end of the motor wire 315 is inserted into the motor hole 361 from the opening on the lower side 360b. The end of the motor wire 315 protrudes upward from the opening of the motor hole 361 on the upper side 360a.

The motor wire 315 is bonded to the control board 360 by solder 393. The solder 393 sticks to the rim of the motor hole 361 on the upper side 360a, the inner surface of the motor hole 361, and the rim of the motor hole 361 on the lower side 360b. A fillet of the solder 393 is formed on each of the upper side 360a and the lower side 360b.

The flange portion 379 is positioned inside a disk-shaped space surrounded by the inner annular surface 371a. The flange portion 379 has a through-hole extending through the flange portion 379 in the Z-direction.

In the present embodiment, three flange portions 379 are connected to the inner annular surface 371a. The through-holes 379c formed in the three flange portions 379 are located on a circumference of a circle whose center is the center of the base portion 371. The three through-holes 379c are arranged at intervals of 120 degrees.

The shank of the bolt 390 passes through the through-hole 379c. The end of the bolt 390 is fastened to the bolt hole 314d. The flange portion 379 is clamped between the head of the bolt 390 and the first end side 314a of the housing 314. Accordingly, the connector 370 is fixed to the motor 310.

<Cover>

The cover 380 has a top plate 381 and a side wall 382. The top plate 381 has a flat shape whose thickness in the Z-direction is thin. The top plate 381 has an inner surface 381a and an outer surface 381b aligned in the Z-direction.

The side wall 382 protrudes from the rim of the inner surface 381a the Z-direction. The side wall 382 has an annular shape surrounding the inner surface 381a.

The side wall 382 has an annular end 382b spaced from the inner surface in the Z-direction as shown in FIGS. 4, 11. The annular end 382b has a second protrusion 383 protruding in the Z-direction. The second protrusion 383 has an annular shape about a line along the Z-direction.

The second protrusion 383 is inserted into the second recess 374 of the connector 370 as shown in FIG. 12. The second protrusion 383 and the second recess 374 are physically connected through the second adhesive 392. The gap between the second protrusion 383 and the second recess 374 is sealed by the second adhesive 392. Accordingly, the gap between the connector 370 and the cover 380 is sealed by the second adhesive 392.

<Method of Manufacturing Drive Device>

First, the motor 310 is provided as shown in FIG. 6. Then the motor 310 is fixed by a jig or the like such that the second end side 314b is located below the first end side 314a in the vertical direction.

Next, the control board 360 and the connector 370 are prepared. The lower side 360b of the control board 360 is brought into contact with the support surface 377a of the support portion 377 of the connector 370. At the same time, the protrusion 377b protruding from the support surface 377a is inserted into the positioning hole 365 opening on the lower side 360b. Thereby, the position of the control board 360 relative to the connector 370 is temporarily fixed. The sensor pin 375, the communication pin 376, and the power pin are inserted into and soldered to the sensor hole 362, the communication hole 363, and the power hole of the control board 360 respectively.

As a result of the fixation of the control board 360 to the connector 370, the bolt through-hole 364 of the control board 360 and the through-hole 379c of the flange portion 379 are aligned in the Z-direction. The motor hole 361 and the guide hole 378c are aligned in the Z-direction.

Although three through-holes 379c are formed, the number of the bolt through-hole 364 is one. Two through-holes 379c which are not aligned with the bolt through-hole 364 in the Z-direction do not overlap the control board 360 in the Z-direction. The inner radius of the bolt through-hole 364 is larger than that of the through-hole 379c.

Next, the connector 370 to which the control board 360 is fixed is positioned on the first end side 314a of the housing 314. At the same time, the first adhesive 391 in the liquid phase is applied to the first recess 316.

At this time, the motor wire 315 is inserted into the guide hole 378c from the opening on the lower side 378b. The motor wire 315 is also inserted into the motor hole 361 from the opening on the lower side 360b. Accordingly, the end of the motor wire 315 protrudes upward from the opening of the motor hole 361 on the upper side 360a.

The first protrusion 373 is inserted into the first recess 316 filled with the first adhesive 391 in the liquid phase. Accordingly, the first adhesive 391 filled in the first recess 316 overflows from the first recess 316. The gap between the first protrusion 373 and the first recess 316 is filled with the first adhesive 391.

As described above, when the connector 370 to which the control board 360 is fixed is positioned relative to the motor 310, the bolt through-hole 364, the through-hole 379c, and the bolt hole 314d are aligned in the Z-direction. The shank of the bolt 390 is inserted into three or two of these holes aligned in the Z-direction. The end of the bolt 390 is fastened to the bolt hole 314d. The flange portion 379 is clamped between the head of the bolt 390 and the first end side 314a of the housing 314. As a result, the connector 370 and the motor 310 are fixed.

Subsequently, the end of the motor wire 315 protruding upward from the opening of the motor hole 361 on the upper side 360a is removed. The motor wire 315 is bonded to the control board 360 by the solder 393 on the upper side 360a.

As described above, the control board 360 is fixed to the connector 370 such that the lower side 360b is in contact with the support surface 377a. The opening of the motor hole 361 on the lower side 360b is spaced in the Z-direction from the upper side 378a on which the guide hole 378c opens.

When the motor wire 315 is bonded to the control board 360 on the upper side 360a, the melted solder 393 flows through the motor hole 361 from the upper side 360a to the lower side 360b. As a result, the solder 393 extends from the upper side 360a to the lower side 360b through the motor hole 361. The fillets of the solder 393 are formed not only on the upper side 360a but also on the lower side 360b. The lower side 360b of the control board 360 and the upper side 378a of the guide portion 378 are spaced in the Z-direction from each other such that the formation of the fillet of the solder 393 on the lower side 360b is not limited.

Next, the cover 380 is positioned above the upper support surface 371c of the connector 370. At the same time, the second adhesive 392 in the liquid phase is applied to the second recess 374.

The first protrusion 373 is inserted into the first recess 316 filled with the first adhesive 391 in the liquid phase. Accordingly, the second adhesive 392 filled in the second recess 374 overflows from the second recess 374. The gap between the second protrusion 383 and the second recess 374 is filled with the second adhesive 392.

Through the above steps, the cover 380 is fixed to the motor 310 through the connector 370. The control board 360 is housed in the housing space defined by the motor 310, the connector 370, and the cover 380. Parts of the control board 360 for electrical connection with the motor 310 and the connector 370 are housed in the housing space.

<Effects>

As described above, when the control board 360 is mounted on the support portion 377, the motor hole 361 of the control board 360 opening on the lower side 360b is spaced in the Z-direction from the upper side 378a on which the guide hole 378c of the guide portion 378 opens.

Accordingly, the fillets of the solder 393 connecting the motor wire 315 and the control board 360 are formed not only on the upper side 360a but also on the lower side 360b. Accordingly, the strength of the solder 393 connecting the control board 360 and the motor wire 315 can be increased. As a result, occurrence of electrical connection failure between the motor 310 and the control board 360 can be suppressed.

The motor wire 315 passes through the guide hole 378c. Accordingly, when a part of the motor wire 315 between the connection part with the solder 393 and the connection part with the stator coil swings, the part of the motor wire 315 contacts the wall defining the guide hole 378c. Since the motor wire 315 contacts the wall surface, the motion of the motor wire 315 can be suppressed. Accordingly, the stress on the solder 393 connecting the motor wire 315 and the control board 360 due to the motion of the motor wire 315 can be suppressed. As a result, occurrence of electrical connection failure between the motor 310 and the control board 360 can be suppressed.

An inner radius of the opening of the guide hole 378c on the lower side 378b is larger than an inner radius of the opening of the guide hole 378c on the upper side 378a. Accordingly, the motor wire 315 can be easily inserted into the guide hole 378c from the opening on the lower side 378b.

As described above, since the cover 380 is fixed to the motor 310 through the connector 370, the housing space is defined, and the control board 360 is housed in the housing space. The gap between the motor 310 and the connector 370 is sealed by the first adhesive 391, as well as the gap between the connector 370 and the cover 380 is sealed by the second adhesive 392. Accordingly, the deterioration of the sealing properties of the housing space can be suppressed. Therefore, the control board is protected from dust, moisture, and the like.

As described above, the first adhesive 391 and the second adhesive 392 are adhered to the connector 370. The connector 370 has bonded parts (sealing parts) bonded by the adhesives. For this reason, the inspection of the sealed portions becomes easier as compared with a configuration in which the sealed portions is disposed in several members.

Further, the first recess 316 and the first protrusion 373 are connected through the first adhesive 391. The second recess 374 and the second protrusion 383 are connected through the second adhesive 392. As a result, the thickness of the adhesive between the housing space and the outside is thick. Accordingly, the sealing property is improved. Moreover, the strength of the physical connection between the motor 310 and the connector 370, and the strength of the physical connection between the connector 370 and the cover 380 are improved by anchor effect.

According to the method of manufacturing the drive device 300, when connecting the motor 310, the connector 370, and the cover 380, these do not need to be reversed in the vertical direction. Accordingly, the manufacturing method can be simplified.

Although the present disclosure is described with reference to the preferred embodiment, the present disclosure is not limited to the above-described embodiment but may be implemented with various modifications without departing from the spirit of the present disclosure.

Additional advantages and modifications will readily occur to those skilled in the art. The disclosure in its broader terms is therefore not limited to the specific details, representative apparatus, and illustrative examples shown and described.

What is claimed is:
1. A drive device comprising:
a motor;
a control board configured to control the motor;
a connector located between the motor and the control board in a predetermined direction, the connector electrically connecting the control board and an external device; and
a solder connecting the control board and a motor wire that extends from the motor to the control board through the connector in the predetermined direction, wherein
the control board has a through-hole through which the motor wire passes, the through-hole opening on a lower side of the control board facing the connector and on an upper side of the control board that is an opposite side of the lower side,
the connector includes
a base portion connected to the motor,
a support portion that protrudes from the base portion in the predetermined direction toward the control board such that a tip surface of the support portion is in contact with the lower side of the control board, thereby the support portion supporting the control board, and
a guide portion that has a guide hole through which the motor wire passes, the guide hole opening on a lower side of the connector facing the motor and on an upper side of the connector facing the control board, the upper side of the connector is farther in the predetermined direction from the lower side of the control board than the tip surface is from the lower side of the control board, and a fillet of the solder is formed on both the upper side and the lower side of the control board, wherein the control board has a positioning hole opening on the lower side, the support portion has a protrusion protruding from the tip surface toward the control board, and the protrusion is inserted into the positioning hole.

\* \* \* \* \*